US012679284B2

(12) United States Patent
Kauffman et al.

(10) Patent No.: US 12,679,284 B2
(45) Date of Patent: Jul. 14, 2026

(54) FOLDING AND EXTENDABLE BEAM ASSEMBLY FOR USE IN A CARGO COMPARTMENT

(71) Applicant: Ancra International LLC, Azusa, CA (US)

(72) Inventors: Gregory Kauffman, Cincinnati, OH (US); Jerome Jones, Independence, KY (US)

(73) Assignee: Ancra International LLC, Azusa, CA (US)

( * ) Notice: Subject to any disclaimer, the term of this patent is extended or adjusted under 35 U.S.C. 154(b) by 481 days.

(21) Appl. No.: 18/336,383

(22) Filed: Jun. 16, 2023

(65) Prior Publication Data

US 2023/0406221 A1     Dec. 21, 2023

Related U.S. Application Data

(60) Provisional application No. 63/353,351, filed on Jun. 17, 2022.

(51) Int. Cl.
B60R 11/00 (2006.01)
B60P 7/15 (2006.01)
(52) U.S. Cl.
CPC .............. B60R 11/00 (2013.01); B60P 7/15 (2013.01)

(58) Field of Classification Search
CPC .. B60R 11/00; B60P 7/15; B60P 7/135; B60P 7/0815; B60P 7/0807; B60P 7/0892; B61D 45/001; B65D 90/0053
USPC .................................................. 410/140–149
See application file for complete search history.

(56) References Cited

U.S. PATENT DOCUMENTS

| | | | | |
|---|---|---|---|---|
| 4,702,653 A | * | 10/1987 | Gaulding .................. | B60P 7/15 |
| | | | | 410/152 |
| 4,723,880 A | * | 2/1988 | Stumpf, Jr. ............... | B60P 7/15 |
| | | | | 248/552 |
| 8,123,282 B1 | * | 2/2012 | Miller ....................... | B60P 1/02 |
| | | | | 296/181.3 |

* cited by examiner

*Primary Examiner* — Amy R Weisberg
*Assistant Examiner* — Philip C Adams
(74) *Attorney, Agent, or Firm* — Shook, Hardy & Bacon L.L.P.

(57) ABSTRACT

A beam and a beam storage assembly for a trailer (or other cargo compartment) can include various elements. For example, the beam storage assembly can include a first track assembly configured to attach to a first sidewall of the cargo compartment. The first track assembly can include a housing for storing the beam in a vertical orientation. In addition the beam can move from the stored state to a deployed state, in which the beam attaches to a second track assembly on the opposing second sidewall.

20 Claims, 18 Drawing Sheets

FOLDING AND EXTENDABLE BEAM ASSEMBLY FOR USE IN A CARGO COMPARTMENT

BACKGROUND

The present embodiments relate generally to systems and methods for restraining cargo, such as carts, when disposed in a movable cargo compartment.

Certain movable cargo compartments employ the use of beams or straps to restrain cargo being transported within the cargo compartment. In some systems, stand-alone beams are brought in from outside of the cargo compartment, and in each usage are engaged and disengaged from coupling locations in the cargo compartment. In such situations, the standalone beams are required to be stored at a loading dock, and may need to be moved on and off the cargo compartment each time it is loaded or unloaded. This process takes added time and may increase the likelihood of injuries.

In some other systems, cargo securement straps may be used to secure cargo. However, in a situation where the cargo comprises a plurality of carts, a significant number of straps would be required to adequately restrain the carts individually. Further, the straps would take a relatively long time to install, and subsequently need to be rolled into a storage state.

Moreover, in prior systems, when a beam is stored at the top of the cargo compartment, it may reduce the height for which cargo can be inserted into the compartment. In some situations, for example, when the beam is a rearward beam adjacent to trailer doors, such a beam that is stored at the ceiling of the trailer can impede the ability to advance high-cube freight through the opening in the rear of the trailer and into the cargo compartment.

SUMMARY

Systems and methods are provided for restraining cargo in a cargo compartment. In one embodiment, the system comprises a first track assembly positioned on a first sidewall of a cargo compartment, and a second track assembly positioned on a second sidewall of the cargo compartment. A beam assembly comprises a first end assembly configured to be secured to the first track assembly and selectively moved along a track of the first track assembly, and a second end assembly configured to be removably secured to the second track assembly and moved along a track of the second track assembly. The beam assembly comprises a storage state in which it is positioned in a vertical orientation with both the first and second end assemblies disposed adjacent to the first sidewall, and the beam assembly further comprises a deployed state in which it extends across the cargo compartment from the first sidewall to the second sidewall.

In another aspect, the system comprises a first track assembly positioned on a first sidewall of a cargo compartment, a beam assembly comprising a first end assembly configured to be secured to the first track assembly and selectively moved along a track of the first track assembly, and the first track assembly comprises a housing. The track is received within the housing, and the beam assembly is positioned in a vertical orientation within the housing in a storage state. In one example, the housing may comprise a forward guard and a rearward guard, wherein the track is disposed in an axial space formed between the forward guard and the rearward guard. A storage compartment may be formed in the housing, the storage compartment being bounded at least partially by walls of the forward guard and the rearward guard, in addition to a plane holding the track of the first track assembly. The beam assembly is movable from the storage state to a deployed state in which the beam assembly extends at least partially horizontally to restrain cargo in the cargo compartment.

In yet another aspect, a method for restraining cargo in a cargo compartment comprises providing a first track assembly positioned on a first sidewall of a cargo compartment, and providing a second track assembly positioned on a second sidewall of the cargo compartment. A beam assembly is provided and comprises a first end assembly configured to be secured to the first track assembly and selectively moved along a track of the first track assembly, and further comprises a second end assembly configured to be removably secured to the second track assembly and selectively moved along a track of the second track assembly. The method further comprises positioning the beam assembly in a storage state in which the beam assembly is positioned in a vertical orientation with both the first and second end assemblies disposed adjacent to the first sidewall. Further, the method comprises actuating the beam assembly to a deployed state in which the beam assembly extends across the cargo compartment from the first sidewall to the second sidewall.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
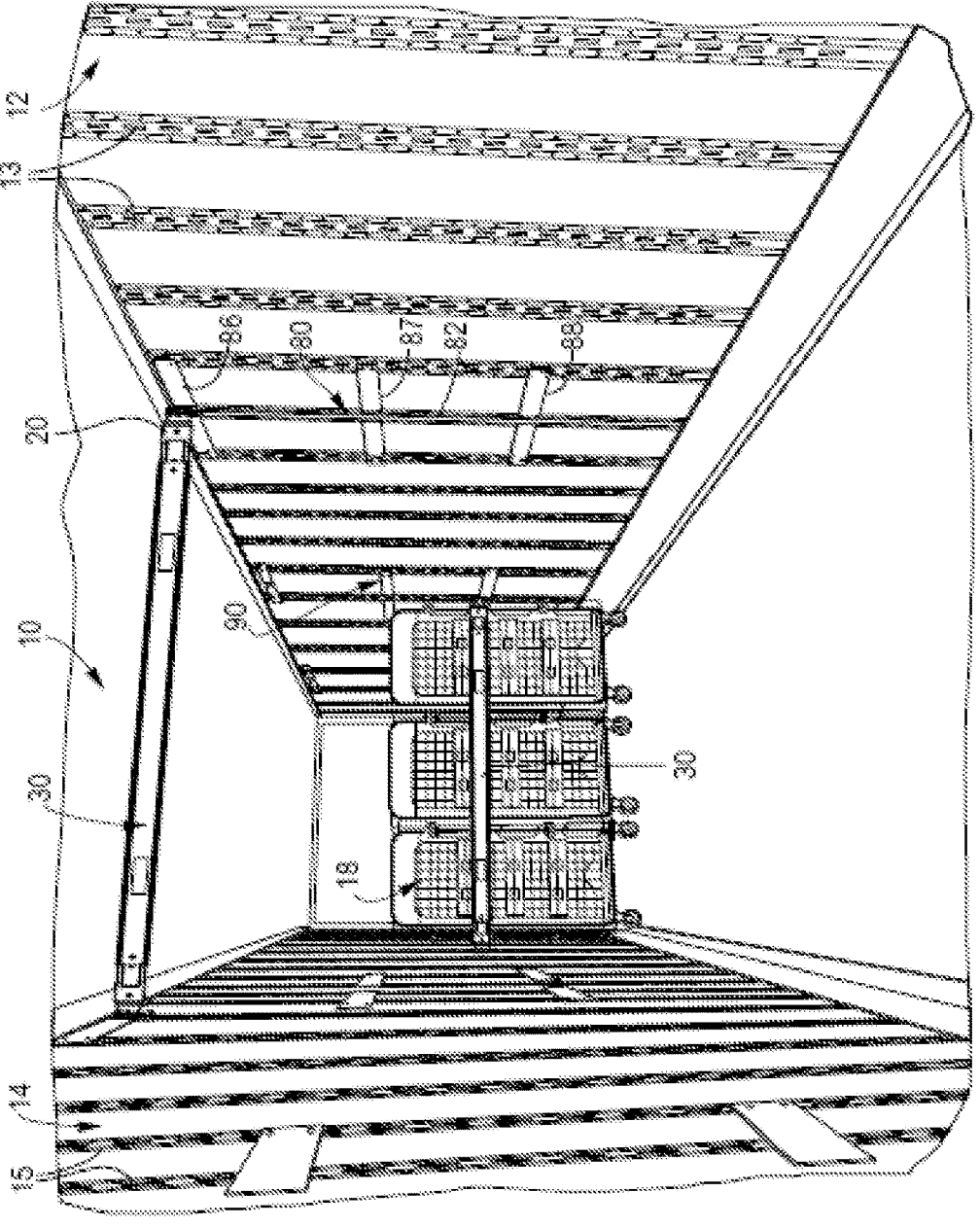
FIG. 1 is a perspective view of an exemplary cargo compartment, including features of a system for restraining cargo in accordance with the present embodiments, taken in a rearward to forward direction.
Figure 2:
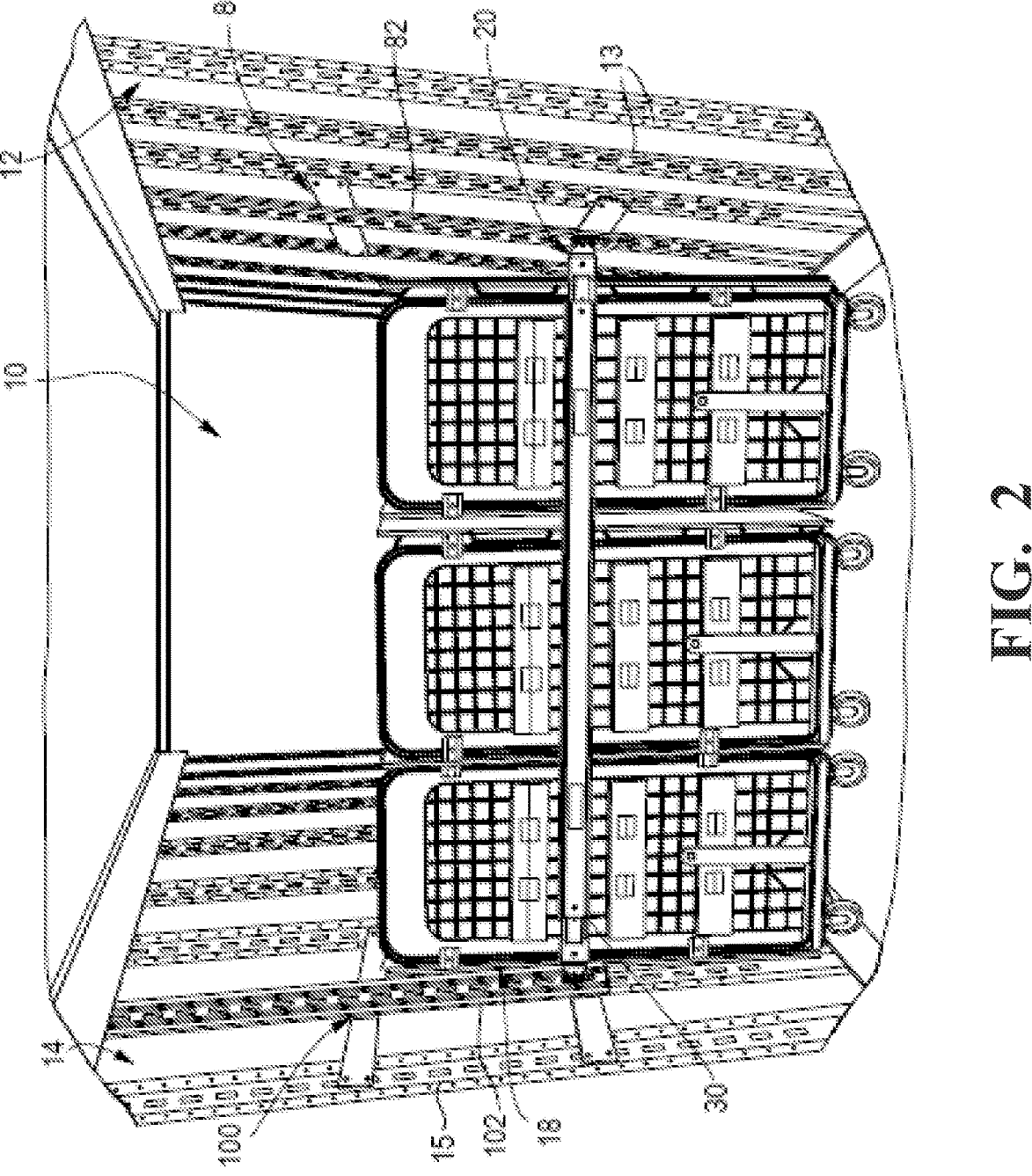
FIG. 2 is an enlarged perspective view of the cargo compartment of FIG. 1.

Referring to FIGS. 1-9G, a system 20 for restraining cargo 18 within a cargo compartment 10 is provided. As depicted in FIGS. 1-2, the cargo compartment 10 may be for a truck, an intermodal container, a trailer, a rail car, a compartment on a boat or aircraft or the like. While any of these types of cargo compartments can successfully receive the system 20, the system 20 will be described and depicted in detail as installed and used within the cargo compartment of a truck. One of ordinary skill in the art with a thorough review of this specification and figures will readily understand that the system 20 can be adapted for other types of cargo compartments and would be able to implement the system 20 in other types of cargo compartments.

Moreover, while many types of cargo 18 can successfully be restrained by the system 20, the cargo 18 will be described and depicted herein as a plurality of carts 18. One of ordinary skill in the art with a thorough review of this specification and figures will readily understand that the system 20 can be adapted for other types of cargo and would be able to implement the system 20 with other types of cargo (such as boxes or pallets), in addition to carts.

In one embodiment, the system 20 may comprise a plurality of beam assemblies 30 (shown in FIGS. 1-2), or one or more beam assemblies 230 (shown in FIGS. 4-13D), that are adapted to be adjustably mounted within the cargo compartment 10, such as between opposing sidewalls 12 and 14 of the cargo compartment 10, and to be movable vertically within the cargo compartment 10 as desired by a user. In one example, the system 20 may be provided within the cargo compartment of a truck to provide a barrier to maintain the carts 18 (or other cargo) disposed between spaced-apart beam assemblies 30 or 230 during movement.

Figure 3:
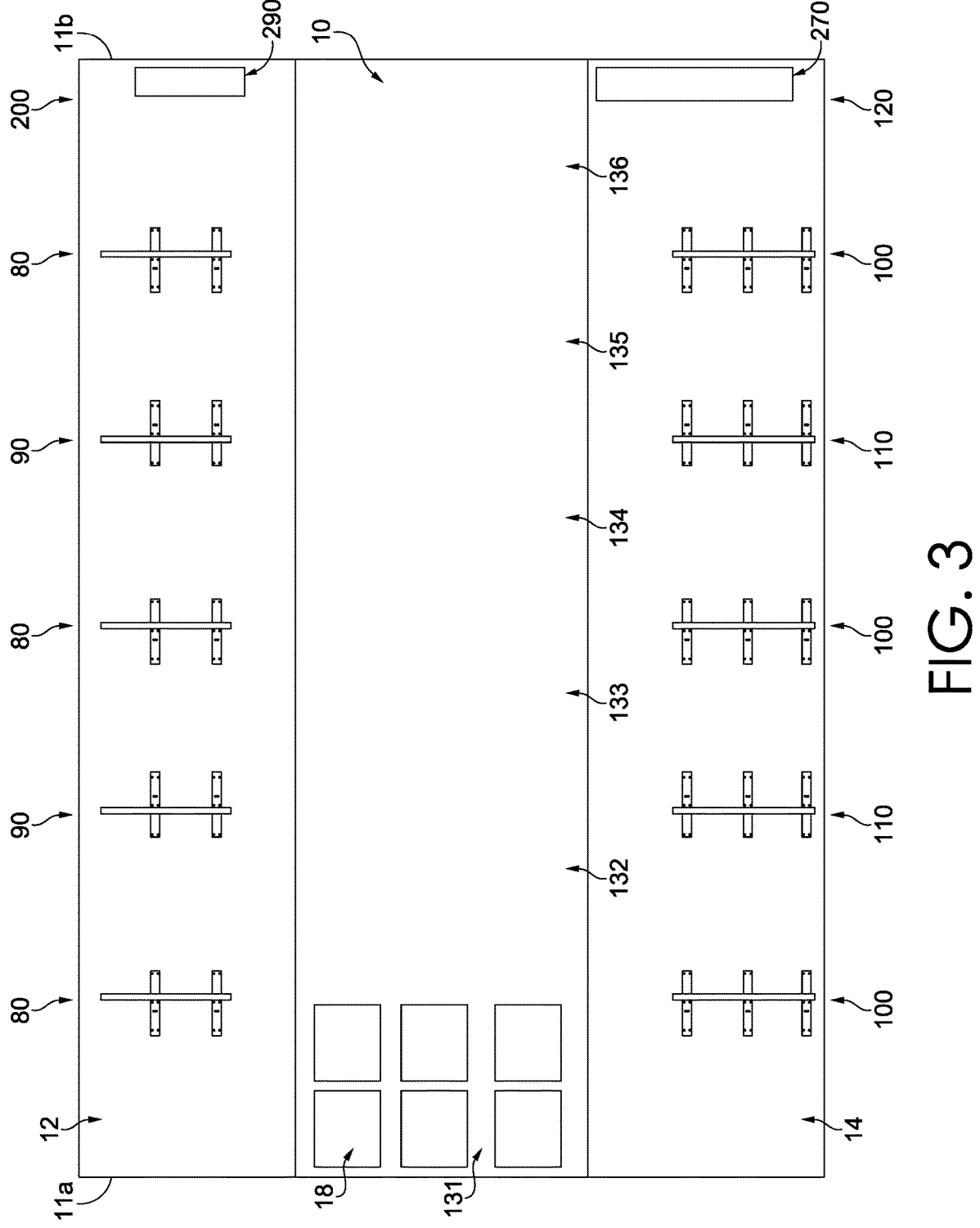
FIG. 3 is a schematic top view depicting an exemplary layout of various track subassemblies in a cargo compartment, with sidewalls depicted as being laid flat for illustrative purposes instead of being raised 90 degrees upward.

In the example shown in FIGS. 1-3, the system 20 may comprise a plurality of track subassemblies 80, 90, 100 and 110, which may be positioned in a pre-determined manner relative to preexisting vertical logistics posts 13 and 15 on the sidewalls 12 and 14 of the cargo compartment 10, respectively. As explained further below, the plurality of track sub-assemblies 80, 90, 100 and 110 advantageously permit a cargo compartment 10 to be retrofitted with newly-positioned track locations for the plurality of beam assemblies 30, which may allow for an optimal number of carts 18 or other cargo to be loaded into the cargo compartment 10.

The plurality of track sub-assemblies 80, 90, 100 and 110 may be constructed in accordance with the track-subassemblies described in further detail in U.S. Pat. No. 11,345,273 (hereafter "the '273 patent"), which is hereby incorporated by reference in its entirety. As shown in FIG. 2, a first beam 30 may extend laterally across the cargo compartment 10 between a forward-most track sub-assembly 80 and an opposing track sub-assembly 100. Further, a second beam 30 may extend between a more centrally located track sub-assembly 90 and an opposing track sub-assembly 110. In this manner, any number of beams may extend across the cargo compartment 10 in an axially spaced-apart manner, i.e., extending between a forward end 11a and a rearward end 11b of the compartment. In one non-limiting example, six beams may extend laterally across the width of the cargo compartment 10, matching the six spaced-apart subassemblies shown in FIG. 3; however, it will be appreciated that while six beams are described in this example, greater or fewer beams may be used without departing from the spirit of the present embodiments.

In one embodiment, where the cargo compartment 10 is a 53' foot trailer (i.e., 636" in the forward to rearward directions), and there are six zones 131-136 as shown in FIG. 3, then the lengths of each zone 131-136 may be between about 100 and about 105 inches long, taking into account a small amount of space is taken up by the six beam assemblies 30 extending across the cargo compartment. In the example where six zones 131-136 are each between about 100 and about 105 inches long, and two rows of carts 18 are provided in each zone, as depicted in FIG. 3, then the length of each cart 18 (as measured in a forward to rearward direction) may be between about 48 to about 52 inches long. In one example, where each zone 131-136 has two rows of three carts across (as depicted in the formation of FIG. 3), then the cart dimensions may be about 48 to about 52 inches long, about 28 to about 32 inches wide, and the height may be between about 30 to about 90 inches high.

In the exemplary arrangement of FIGS. 1-3, there are five pairs of track sub-assemblies positioned in a relatively forward direction, i.e., from left to right on the page in FIG. 3: a first pair including opposing track sub-assemblies 80 and 100; a second pair including opposing track sub-assemblies 90 and 110; a third pair including opposing track sub-assemblies 80 and 100; a fourth pair including opposing track sub-assemblies 90 and 110; and a fifth pair including opposing track sub-assemblies 80 and 100. The first five beams, positioned in the forward direction in the cargo compartment 10, may be constructed in accordance with the beam 30 shown herein, which is explained in detail in the '273 patent. These forward five beams 30 may move vertically along tracks 82 of respective ones of the forward five pairs of track subassemblies, such that these forward five beams 30 may have a storage state near the ceiling of the cargo compartment 10 (as shown by the upper beam 30 in FIG. 1), and may be brought down to a cargo restraining height during use (as shown by the lower beam 30 in FIGS. 1-2), as explained in further detail in the '273 patent. While FIGS. 1-3 show one exemplary configuration of the forward five pairs of track sub-assemblies (including parts 80, 90, 100 and 110) along with related beam assemblies 30, adapted from a construction shown in the '273 patent, it will be appreciated that any of these forward five pairs of track sub-assemblies and beams may be provided in accordance with other constructions without departing from the present embodiments.

Referring to FIG. 3, it should be noted that a rearward beam assembly (positioned closest to the rearward end 11b of the cargo compartment 10), can be held captive by a different arrangement than the forward five pairs of track sub-assemblies noted above. For example, the rearward beam can be held captive by a restraint module 200 that comprises a first track assembly 270 positioned on the second sidewall 14, and a second track assembly 290 positioned on the first sidewall 12, as shown in FIG. 3, and explained in detail below.

Notably, the restraint module 200 allows a rear beam assembly 230 (described in FIGS. 4 and 5A-5C) to be stored along the second sidewall 14 in the state shown in FIGS. 6A and 6B below (e.g., stowed state), as opposed to being stored close to the ceiling of the cargo compartment 10 (while extending laterally across the width of the cargo compartment). In this manner, the restraint module 200 allows the rear beam assembly 230 to have a stored position that does not extend laterally across the width of the cargo compartment 10, and therefore, advantageously will not impede or block the height within the storage compartment 10 near the opening (e.g., FIG. 4) to the rear of the trailer. This advantageously preserves the ability to advance high-cube freight through the opening in the rear of the trailer and into the cargo compartment 10.

In FIGS. 4 and 5A-5C, an exemplary beam assembly 230 is depicted, and it will be appreciated that other beam assemblies may be used as part of the restraint module 200 without departing from the spirit of the present embodiments. In one example, the beam assembly 230 comprises features of the Vers-A-Deck® beam manufactured by Ancra Cargo of Erlanger, KY.

Figure 5A:
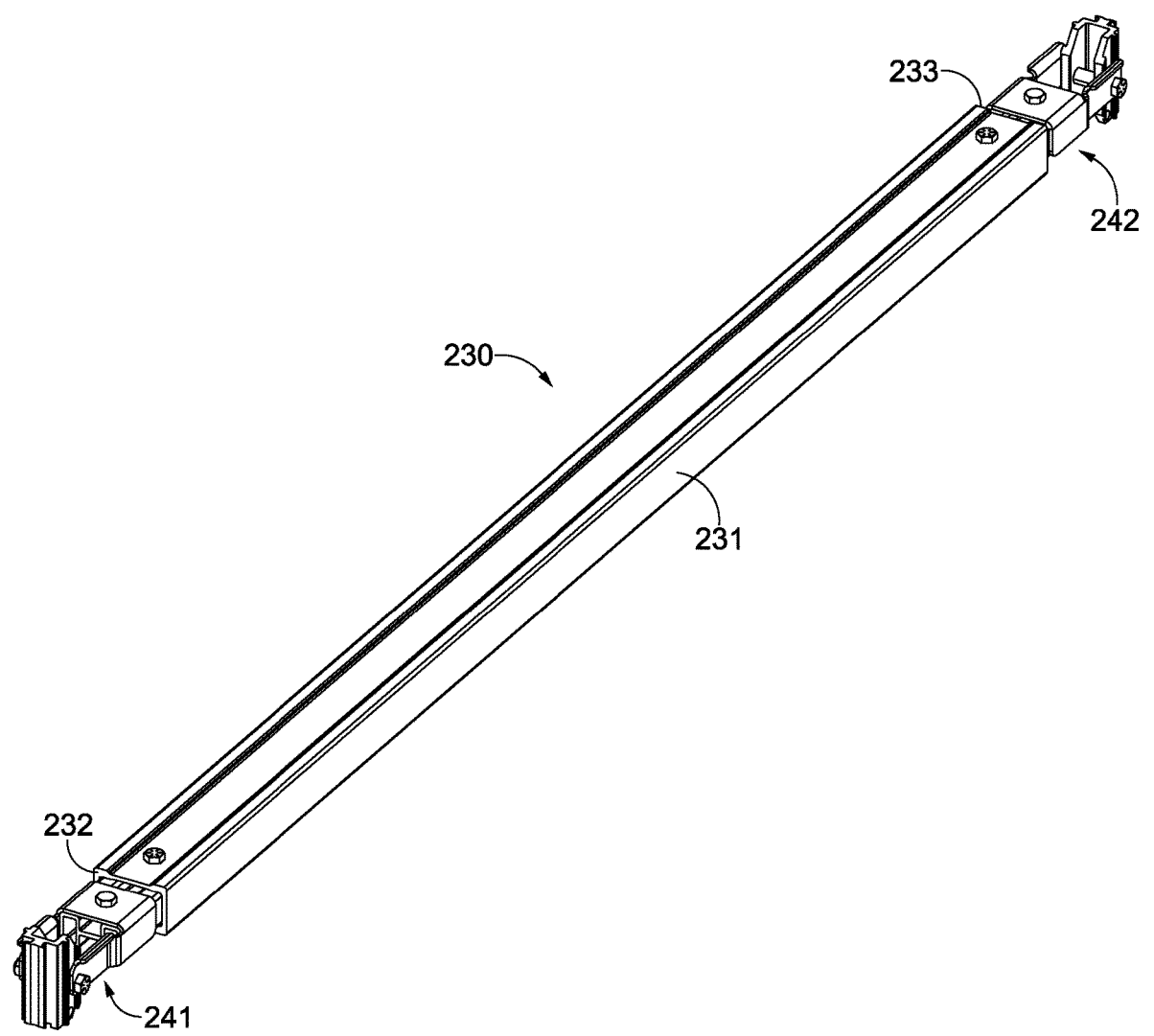
FIG. 5A is a perspective view illustrating features of a beam assembly.
Figure 5B:
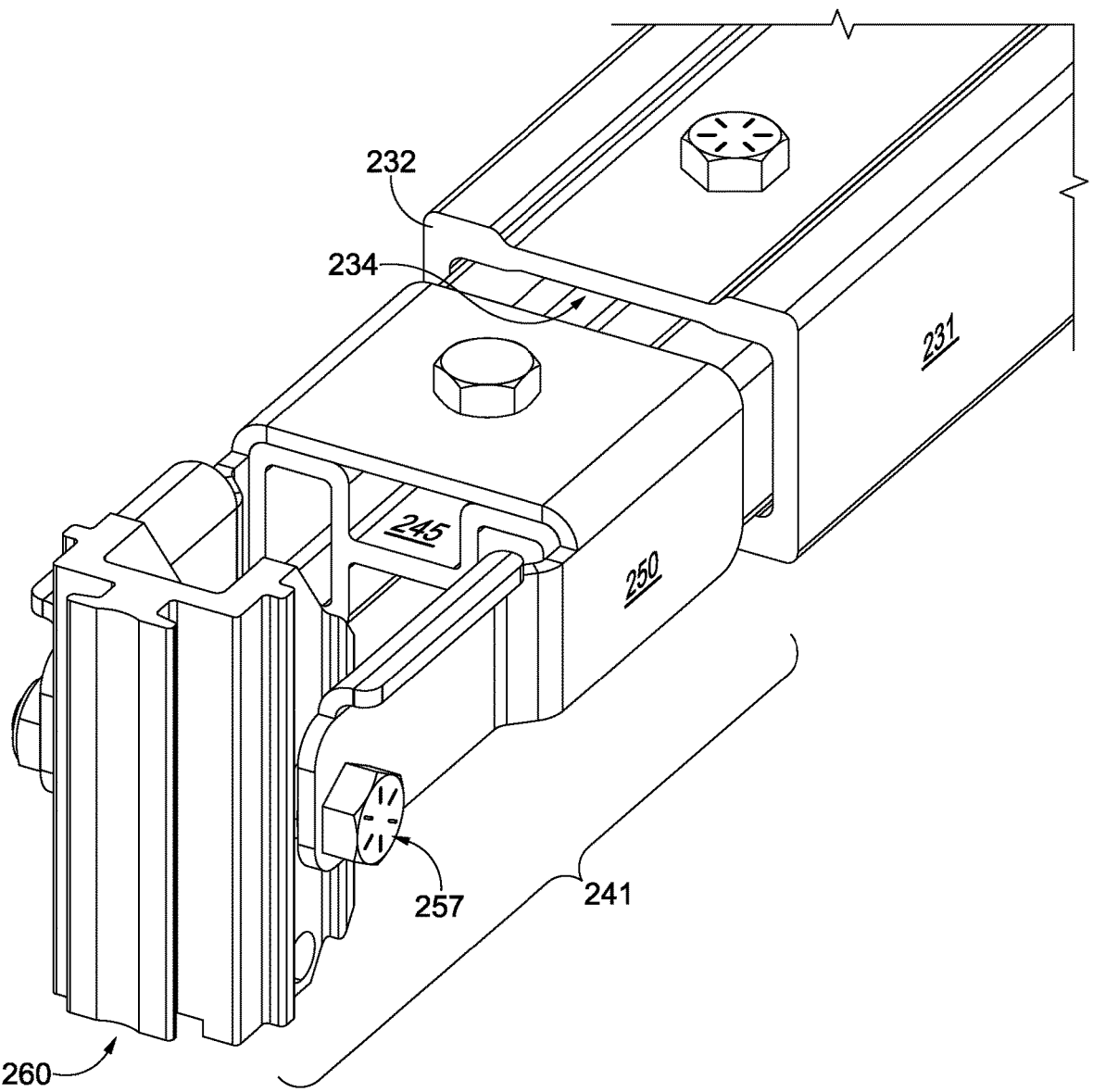
FIG. 5B depicts a close up view of an end of the beam assembly of FIG. 5A.

In one aspect, the beam assembly 230 comprises a beam member 231 having first and second ends 232 and 233, and a hollow interior space 234 (e.g., FIG. 5B). The beam assembly 230 further comprises first and second end assemblies 241 and 242. The first end assembly 241 extends laterally outward from the first end 232 of the beam member 231, while the second end assembly 242 extends laterally outward from the second end 233 of the beam member 231, as best seen in FIG. FIGS. 5A and 5B. In one example, the first end assembly 241 of the beam assembly 230 is substantially identical to the second end assembly 242, and therefore only the first end assembly 241 will be described in detail below.

Figure 5C:
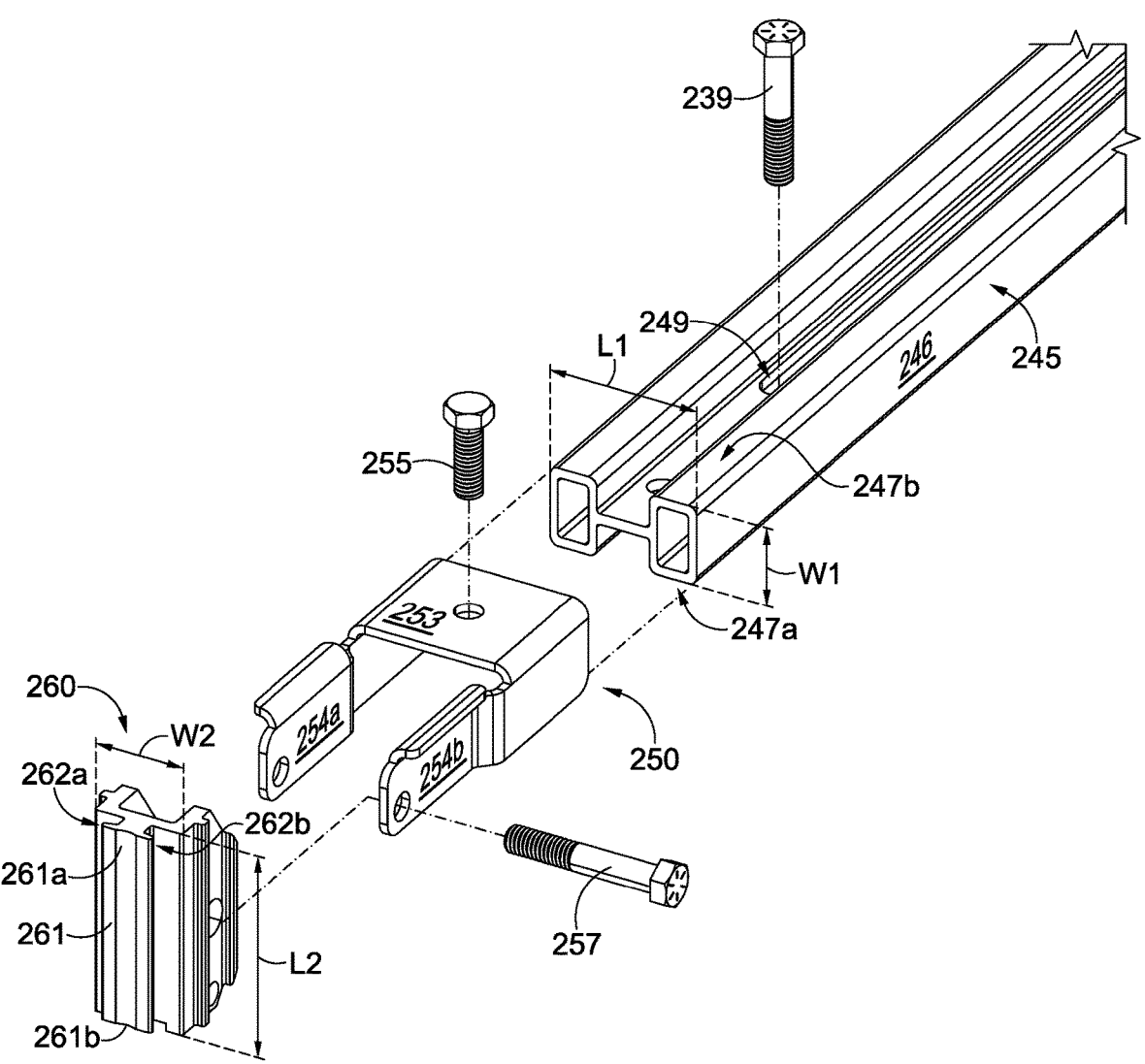
FIG. 5C depicts parts of an end of a beam assembly partially disassembled.

The first end assembly 241 comprises an inner segment 245 (FIGS. 5B and 5C), a bracket assembly 250, and a carriage 260. The inner segment 245 comprises a main body 246 that is dimensioned to be slidably received within the hollow interior space 234 of the beam member 231. The main body 246 has a first end that overlaps with the beam member 231 and has a second end that extends beyond the beam member 231. At least one slot 249 is disposed between the first and second ends of the main body 246, as seen in FIG. 5C. When assembled, a coupling member 239, e.g., a screw or pin with a locking feature, may extend through the slot 249 to secure the first end assembly 241 relative to the beam member 231, and allow a relative axial sliding movement of the first end assembly 241 relative to the beam member 231 (assuming the coupling element 239 does not have a locking feature that is actuated to retain the relative positions of the first end assembly 241 and the beam member 231).

Referring to FIGS. 5B and 5C, in a non-limiting embodiment, the bracket assembly 250 may comprise a main body 253 that is coupled to the inner segment 245 (e.g., via fastener 255), and further comprises spaced-apart carriage-engaging regions 254a and 254b forming an interior space for receiving a portion of the carriage 260. In one embodiment, a bolt 257 may extend through an aperture in a first carriage-engaging region 254a of the main body 253, then may extend through an aperture in carriage 260, and further may extend through an aperture in the opposing carriage-engaging region 254b of the main body 253, as depicted in FIG. 5C.

The carriage 260 of the first end assembly 241 may comprise a main body 261 that has a generally vertical orientation between first and second regions 261a and 261b, as best seen in FIG. 5C. The main body 261 may comprise guiding segments 262a and 262b (e.g., rails) configured to engage a track that is part of the first or second track assemblies 270 or 290 positioned in the cargo compartment 10, as will be explained further below. Although not depicted in FIGS. 5A-5C, in some examples a carriage (e.g., also referred to as a latch assembly) can include one or more latching fingers, which can pivot or rotate relative to the carriage and can selectively engage or disengage slots on a track. In one example, as described in U.S. Pat. No. 8,172, 494, which is hereby incorporated by reference in its entirety, the latching finger may be spring-biased towards the sidewalls 12 and 14 of the cargo compartment 10, but may be disengaged from apertures in the track assemblies 270 or 290 upon application of a sufficient force applied to an end feature of the assembly. This is merely one, non-limiting example of how the beam assembly 230 of the present embodiments may be latched into engagement with the first and second track assemblies 270 and 290 of the cargo compartment 10 described further below.

In some examples, the inner segment 245 and the beam member 231 include (e.g., in a cross section), a longer dimension or length "L1" and a shorter dimension or width "W1" (e.g., where the width W1 extends between a first face or lower face 247a and a second face or upper face 247b). In some examples, such as when the beam assembly 230 is stowed and/or when the beam assembly 230 is deployed, the length L1 can extend in the longitudinal (e.g., fore-aft or forward-rearward) orientation of the trailer. Stated differently, when installed in a trailer, in some examples the length L1 can extend substantially horizontally or substantially parallel with the floor or substantially parallel with the sidewall 14. In addition, the carriage 260, or the rails 262a and 262b, can include a longer dimension or length "L2" and a shorter dimension or width "W2." In at least some examples, L2 is oriented perpendicular to the L1. Stated differently, L2 can extend vertically.

Figure 6A:
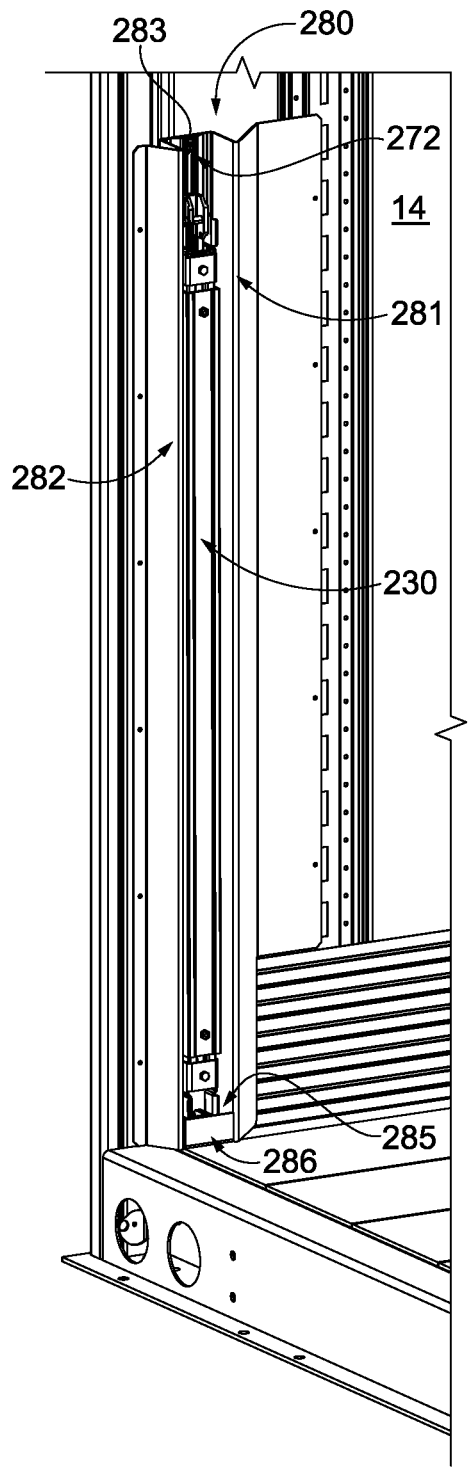
FIG. 6A is a perspective view of a first track assembly of the restraint module of FIG. 4, with a beam assembly in a storage state.
Figure 6B:
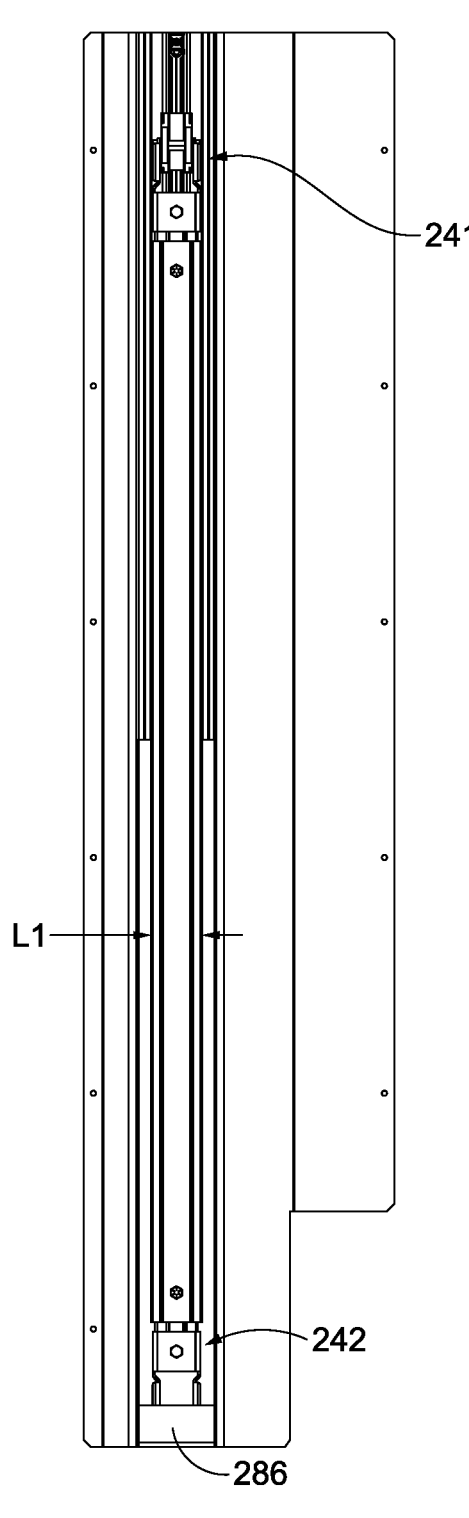
FIG. 6B depicts an elevation view of the first track assembly.

Referring to FIGS. 6A-6B and 7A-7E, examples associated with the first track assembly 270 of the restraint module 200 are shown and described. In FIG. 6A, the first track assembly 270 is positioned on the second sidewall 14 at a location close to the rearward end 11b of the cargo compartment 10, slightly inward of an opening to the rearward end (and slightly inward of where a trailer door would be when the door is closed).

The first track assembly 270 comprises a track 272 positioned within a housing 280. In this example, the housing 280 comprises a forward guard 281 and a rearward guard 282, each of which extends from the second sidewall 14 inwardly towards a central region of the cargo compartment 10 (e.g., FIG. 6A). The track 272 is positioned between the forward guard 281 and the rearward guard 282 of the housing 280.

In examples, the housing 280 can attach to a sidewall 14 in various manners. For example, as depicted in FIG. 6A, the housing 280 can include one or more tabs along a forward edge or portion that can be inserted into recesses of a logistics track that is affixed to the sidewall 14. In some examples, in addition to the tabs or as an alternative, one or more fasteners (e.g., rivets, screws, etc.) can fasten the forward edge or portion to a logistics post or other structure associated with the sidewall 14. In addition, one or more fasteners (e.g., rivets, screws, etc.) can fasten a rearward edge or portion to another portion of the trailer or sidewall 14, such as to the rear door frame.

In at least some examples, the track 272 is configured to slidably receive the carriage 260 of the first end assembly 241, such as by receiving the rails 262a and 262b (FIG. 5C). In addition, as depicted in FIGS. 6A and 6B, the beam assembly 230 can stow between the forward guard 281 and the rearward guard 282. In at least some examples, when the beam assembly 230 is stowed (e.g., FIGS. 6A and 6B), the length L1 generally extends (e.g., is oriented) from the rearward guard 282 to the forward guard 281. Stated differently, if the housing 280 is installed in a trailer, the length L1 can extend in the longitudinal orientation of the trailer (e.g., fore-aft or forward-rearward). As such, the width W1 (e.g., FIG. 5C) that is perpendicular to the length L1 can generally extend in a direction oriented from the sidewall and into the interior cargo space. Described differently, the first face 247a (e.g., FIG. 5C) can be oriented towards the sidewall 14 (or towards a back wall 283 of the housing). Advantageously, this orientation of the beam assembly 230 relative to the housing 280 can allow the beam assembly 230 to be stored flatter against the sidewall 14, which reduces the extent to which the opening to the rear of the trailer might be obscured during loading and/or unloading (e.g., as compared to more conventional systems when the orientation of the beam assembly might be rotated 90 degrees with the width W1 oriented in the fore-aft). In addition, this orientation of the beam assembly 230 within the housing 280 can allow the beam assembly 230 to be better protected by the housing 280 (e.g., from impact of cargo, carts, and/or cargo moving equipment).

Figure 7A:
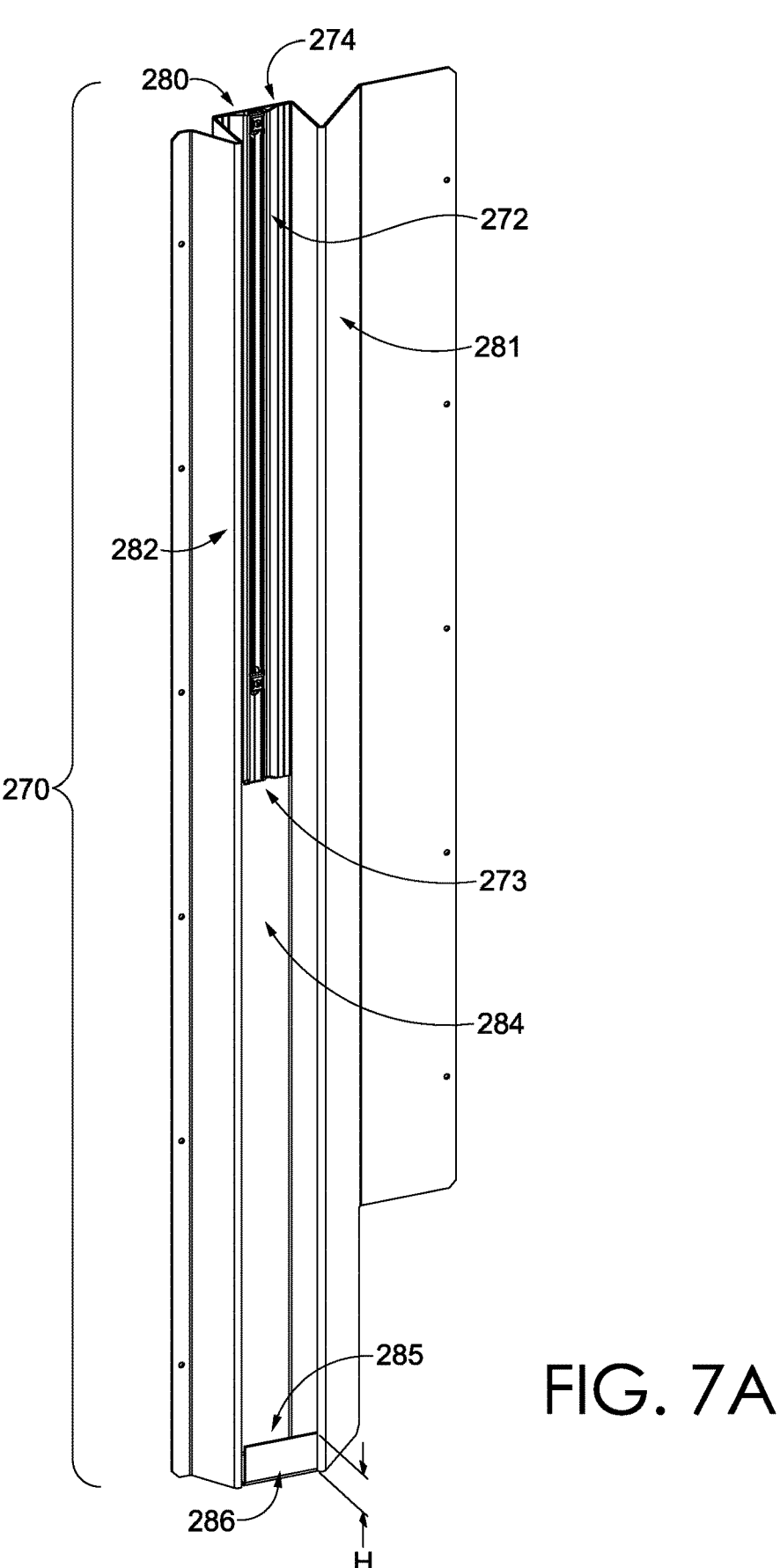
FIG. 7A is a perspective view illustrating the first track assembly of the restraint module.
Figure 7B:
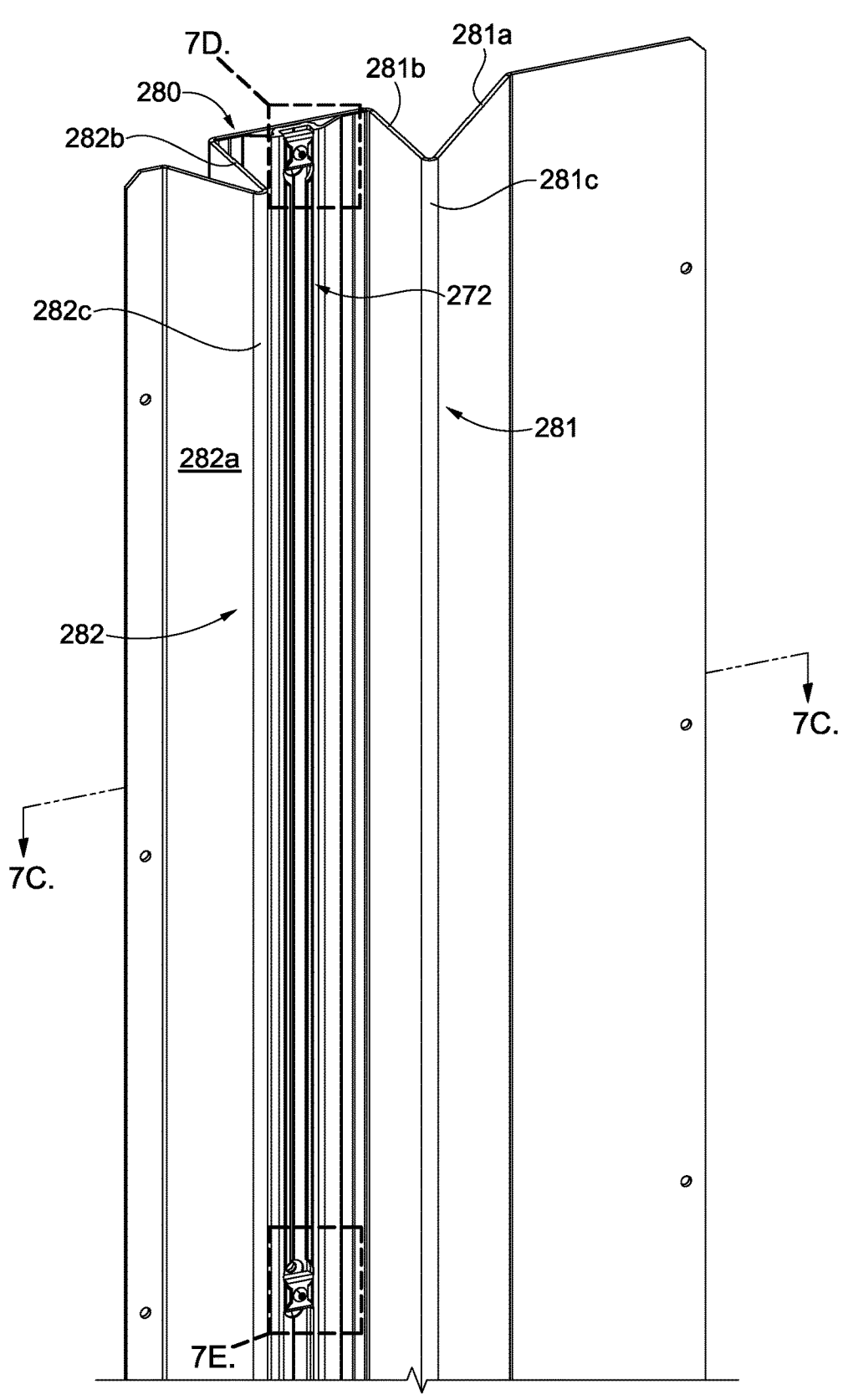
FIG. 7B depicts an enlarged view of an upper portion of the first track assembly.
Figure 7C:
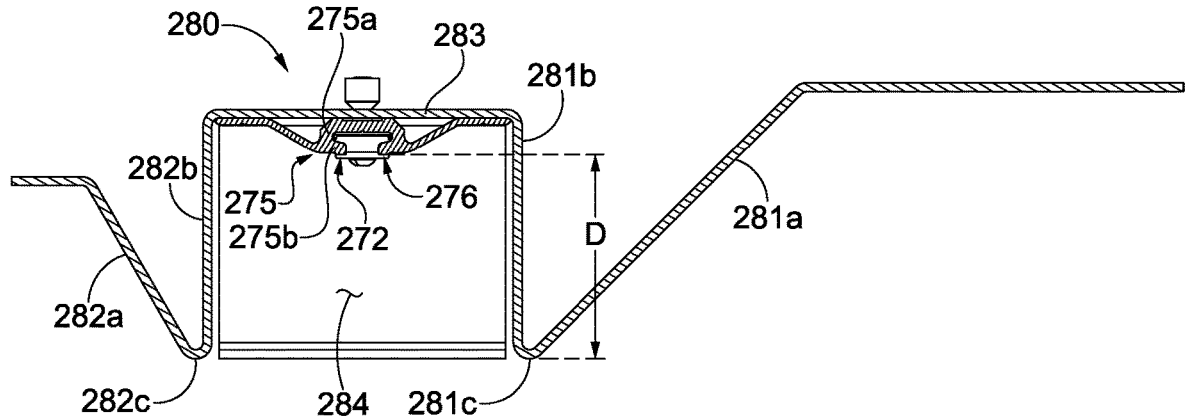
FIG. 7C depicts a cross section referenced in FIG. 7B.
Figure 7D:
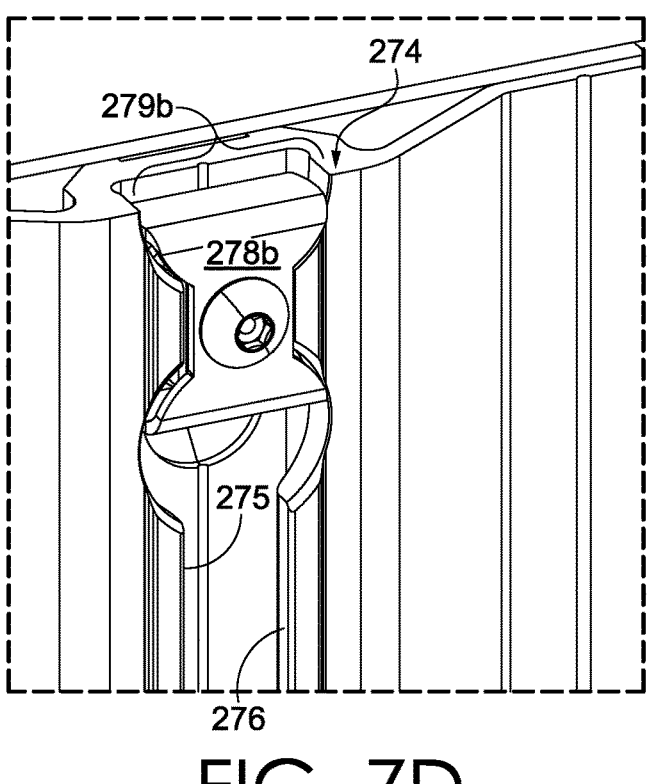
FIGS. 7D and 7E depict enlarged views referenced in FIG. 7B, including an upper stop and a lower stop, respectively.

As shown in FIG. 7A-7C, the forward guard 281 may comprise a first segment 281a (e.g., wall) that has a taper (or non-orthogonal angle) relative to the second sidewall 14 of the cargo compartment. The forward guard 281 further comprises a second segment 281b that may be oriented either orthogonal or at an angle relative to the second sidewall 14, such that the first and second segments 281a and 281b meet up at an inwardly-located segment 281c (e.g., corner or bend), which is closer to an interior space of the cargo compartment 10.

In a similar manner, the rearward guard 282 comprises a first segment 282a that is disposed having a taper (or non-orthogonal angle) relative to the second sidewall 14 of the cargo compartment, and further comprises a second segment 282b that may be oriented either orthogonal or at an angle relative to the second sidewall 14, such that the first and second segments 282a and 282b meet up at an inwardly-located segment 282c (e.g., corner or bend).

Using this design, the track 272 is disposed in an axial space (i.e., forward to rearward direction) formed between the second segment 281b of the forward guard 281 and the second segment 282b of the rearward guard 282, as seen in FIGS. 7A-7C. Additionally, in a laterally inward direction (i.e., from the second sidewall 14 towards the interior space of the compartment 10), the track 272 is recessed within the housing 280, such that there is a distance D (labeled in FIG. 7C) between the track 272 and the inwardly-located segments 281c and 282c of the forward and rearward guards 281 and 282.

In this manner, a storage compartment 284 (e.g., FIG. 7C) is formed in the housing 280, where the storage compartment 284 is bounded on four sides by the following: the second segment 281b of the forward guard 281; the plane or back wall 283 holding the track 272; the second segment 282b of the rearward guard 282; and an axial plane formed between (or co-planar with) the segments 281c and 282c.

Advantageously, the storage compartment 284 is dimensioned to receive the beam assembly 230 in a storage state of the beam assembly, as shown in FIG. 6A. As will be explained further below, in the storage state, the beam assembly 230 is oriented vertically within the storage compartment 284, without protruding significantly (or at all) into the cargo compartment 10 beyond the inwardly-located segments 281c and 282c of the housing 280, thereby providing a guarded space for the beam assembly 230 when not in use.

As an additional advantage, the taper of the first segment 281a of the forward guard 281, and the taper of the first segment 282a of the rearward guard 282, help protect the stored beam assembly 230 from forklift or cargo damage. As can be appreciated, the tapered design of these regions of the forward and rearward guards 281 and 282 can help impede or deflect forklifts or objects away from the housing 280, if inadvertent contact occurs.

Further, a pocket 285 (e.g., FIGS. 6A and 7A) may be formed at the bottom of the storage compartment 284 by the provision of a plate 286 that extends between the inwardly-located segments 281c and 282c of the respective forward and rearward guards 281 and 282. The pocket 285 may be disposed near the floor of the cargo compartment 10 and may extend upward by a height "H" (e.g., FIG. 7A), such that the pocket 285 is dimensioned to receive part of the second end assembly 242 of the beam assembly 230. In some embodiments, the pocket 285 may receive at least a portion of the bracket assembly 250 and/or the carriage 260, as depicted in FIG. 6B. Advantageously, in this manner, the pocket 285 further protects the stored beam assembly 230 from forklift or cargo damage, and also prevents inadvertent movement of the second end assembly 242 of the beam assembly 230, without a conscious vertical lifting movement by a user, as explained further in FIGS. 13A-13B below.

In examples, the track 272 of the first track assembly 270 may have a lower end 273 and an upper end 274 (e.g., FIG. 7A). The track 272 further comprises first and second rails 275 and 276 (e.g., FIG. 7C), which are spaced-apart from one another. The first and second rails 275 and 276 comprise a shape that is configured to allow vertical sliding movement of the guiding segments 262a and 262b, respectively, of the first end assembly 241 of the beam assembly 230. In the example shown, each of the first and second rails 275 and 276 comprises an "L-shape" formed by a first segment 275a that extends generally perpendicularly away from the back wall 283 of the 280 (towards the interior of the cargo compartment), and a second segment 275b that extends generally parallel to the back wall 283, as seen in FIG. 7C. Together, the rails 275 and 276 can form (in a cross section), a "C" shape. Referring back to FIG. 5C, the guiding segments 262a and 262b (e.g., rails) of the beam assembly 230 may comprise a complementary "L-shape" that allows nesting of the guiding segment 262a within the first rail 275, and nesting of the guiding segment 262b within the second rail 276, to achieve a "captive" vertical sliding movement of the first end assembly 241 along the first and second rails 275 and 276 of the track 272.

Figure 4:
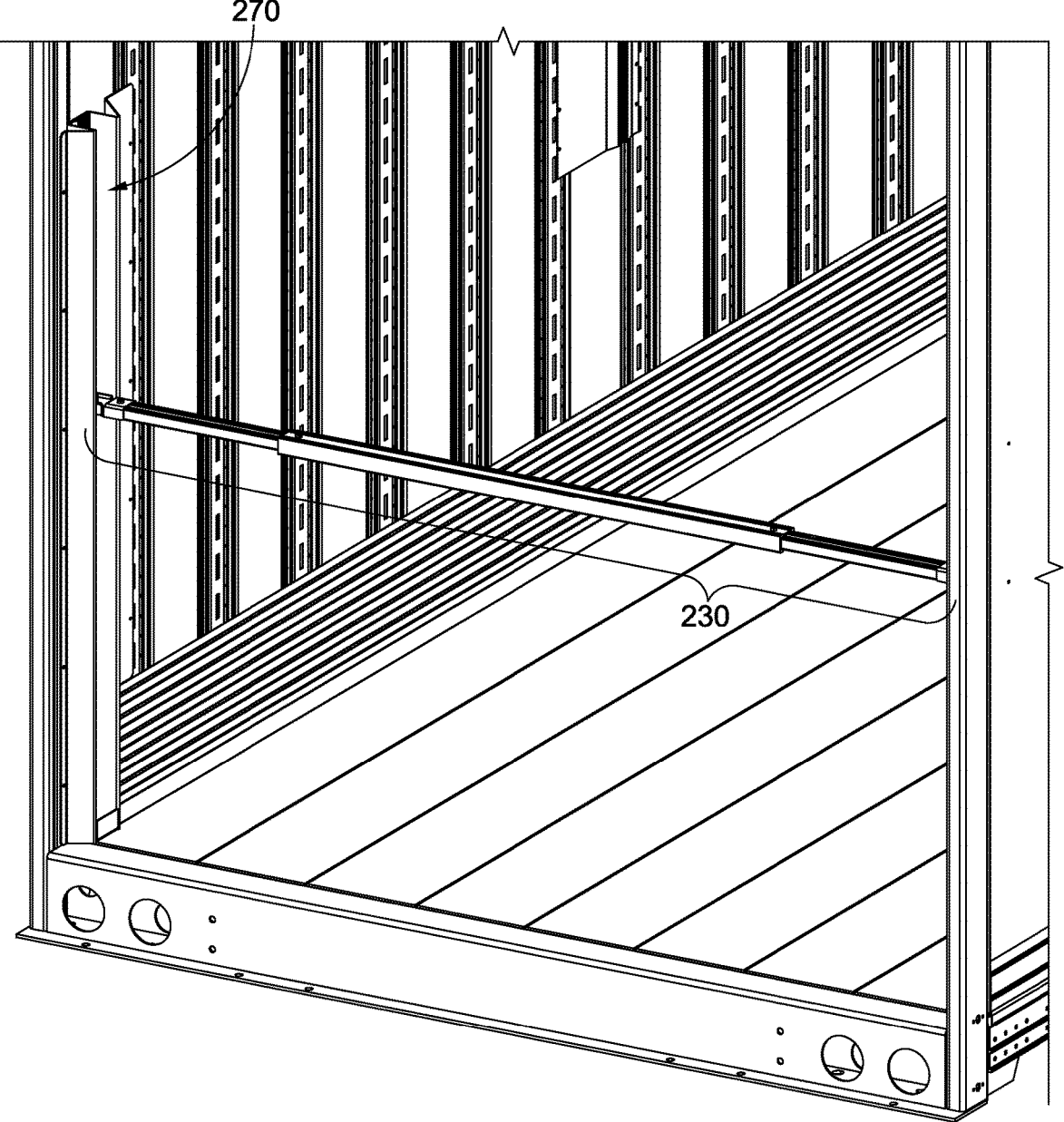
FIG. 4 depicts a beam assembly positioned in association with a restraining module and at the rear of a trailer and in a deployed state in accordance with the present embodiments.

While the carriage 260 is held captive within the rails of the track 272, a remainder of the beam assembly 230 is able to rotate around the bolt 257, which extends through carriage 260 as explained above. In this manner, the remainder of the beam assembly 230 (excluding the carriage 260) may rotate relative to the track 272. This allows the beam assembly 230 to rotate from a vertical orientation (as shown in FIGS. 6A and 6B) to a horizontal orientation (as shown in FIG. 4), while the carriage 260 of the first end assembly 241 is held captive within the rails of the track 272, as will be explained further below. Notably, the end of the bracket 250 that is secured to the bolt 257 is offset from the guiding segments 262*a* and 262*b* secured to the track 272, which allows the central part of the beam assembly 230 (including the beam member 231) to rotate from the horizontal position to the vertical position and align flush with the track 272 in the vertical position.

The lower end 273 of the track 272 may be positioned higher than ground-level, as shown in FIG. 7A. A beam insertion space 279 (FIG. 7E), which omits the rails 275 and 276, may be formed near the lower end 273 of the track, to allow insertion and removal of the beam assembly 230 when necessary, e.g., for periodic maintenance or switching of the beam assembly 230. A lower stop member 278*a*, such as a fastened bracket, screw or pin, may be removably disposed near the lower end of the rails 275 and 276 to ensure that the beam assembly 230 does not inadvertently disengage from the track 272, and can be removed in the event of maintenance or replacement conditions. Similarly, an upper stop member 278*b* may be removably disposed near the upper end of the rails 275 and 276 to ensure that the beam assembly 230 does not inadvertently disengage from the track 272. In this manner, the lower and upper stop members 278*a* and 278*b* provide captivity of the first end assembly 241 of the beam assembly 230 in the vertical directions. In some examples, the track 272 can include an upper beam insertion space 279*b*, which also omits the rails 275 and 276 and can allow insertion and removal of the beam assembly 230 when desired.

Although not depicted in FIGS. 7A-7C, the track 272 may comprise one or more slots that can be selectively engaged by a spring-biased latch finger (if included) of the beam assembly. For example, the first end assembly 241 could be selectively retained in a slot when arranged in a stowed position and/or when arranged in a deployed position. As an alternative (or in addition), the stop 278*a* can be used to set a position of the beam assembly when in a deployed position.

Figure 8A:
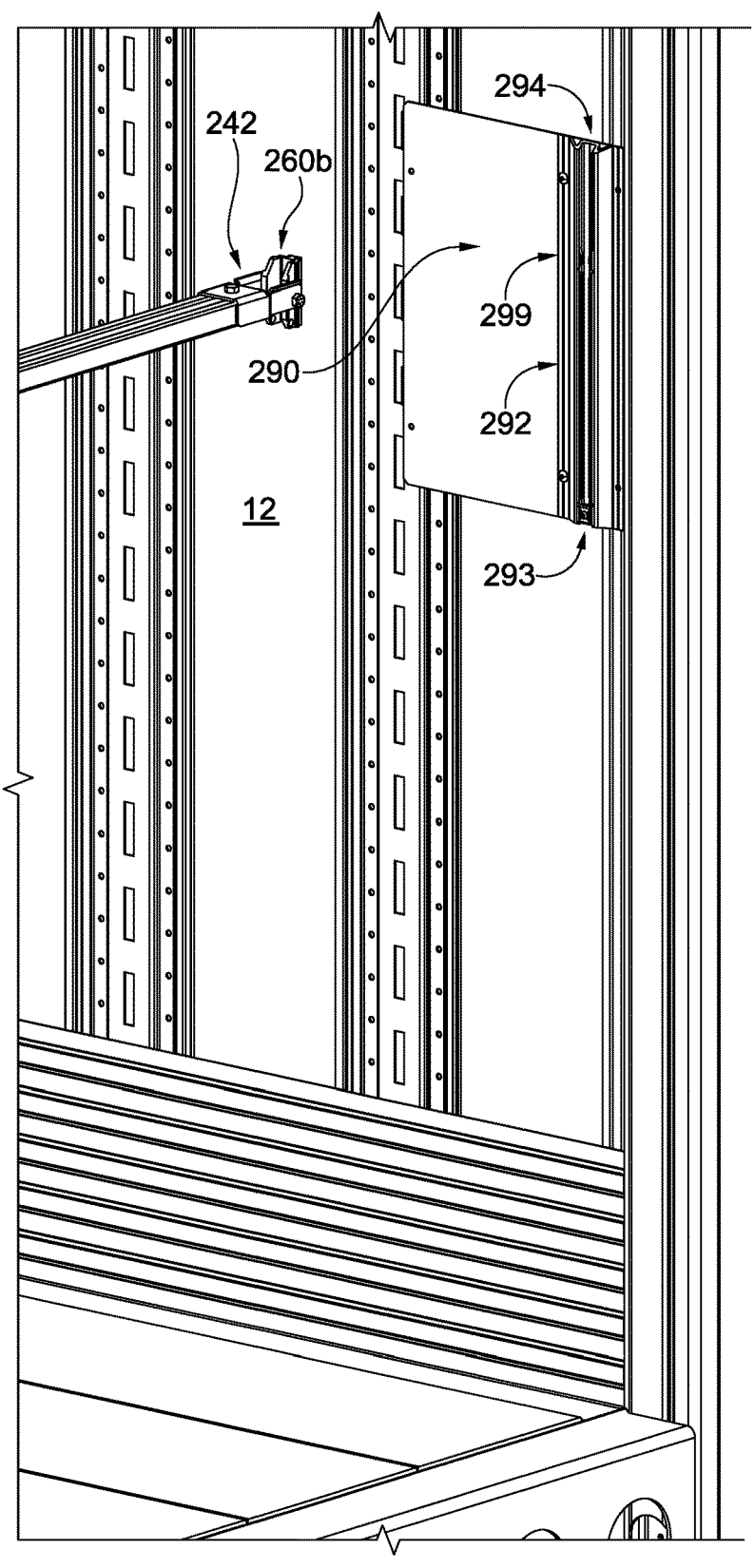
FIGS. 8A and 8B depict the second track assembly.
Figure 8B:
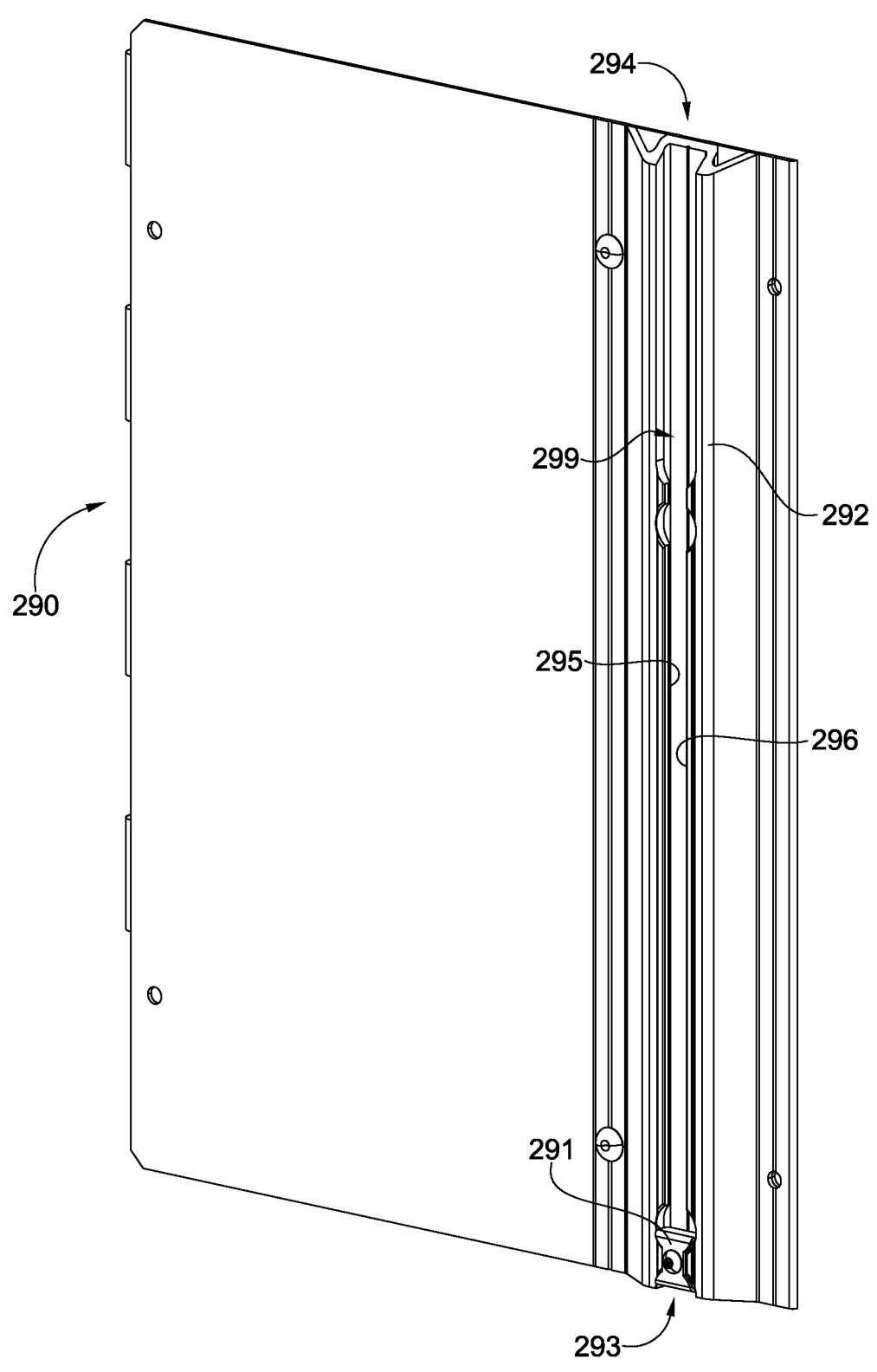

Referring now to FIGS. 8A and 8B, features of the second track assembly 290 are described in further detail. The second track assembly 290 is mounted to the first sidewall 12 of the cargo compartment, such that a track 292 of the second track assembly 290 is at a position directly across from the track 272 of the first track assembly 270.

The track 292 may comprise a lower end 293, an upper end 294 that is positioned closer to the ceiling of the cargo compartment 10, and a beam insertion space 299 positioned vertically in-between the lower and upper ends. The track 292 further comprises first and second rails 295 and 296 that are spaced-apart from one another, and which may comprise a design equivalent to the first and second rails 275 and 276 of the first track assembly 270, described above. In examples, the carriage 260*b* of the second end assembly 242 may comprise guiding segments that nest within the first and second rails 295 and 296 (in the manner described above with regards to the guiding segments 262*a* and 262*b* of the first end assembly 241), to achieve a "captive" vertical sliding movement of the second end assembly 242 along the first and second rails of the track 292.

As seen in FIGS. 8A and 8B, the beam insertion space 299 omits the rails 295 and 296, and allows insertion and removal of the second end assembly 242 of the beam assembly 230, when the carriage 260*b* is vertically aligned with the beam insertion space 299.

In at least some examples, the track 292 can include one or more stops 291. For example, the stop 291 can impede the carriage 260*b* from sliding out of the lower end 293 of the track 292. In some examples, the stop 291 can include a height that is based on a distance between the stop 291 and a floor of the trailer. In some instances, the height associated with the stop 291 can be similar to the (e.g., substantially similar to), a height associated with the stop 278*a*. As such, when the beam assembly 230 is in a deployed position and both carriages 260 and 260*b* are coupled to a respective track, the carriages 260 and 260*b* can each abut (e.g., be supported by) the respective stop 278*a* and 291, and the beam assembly 230 can extend horizontally across the cargo compartment 10, generally parallel to the floor of the cargo compartment 10.

In some examples, the second track assembly 290 may further comprise one or more slots (not shown), that can selectively engage a latch (e.g., spring actuated latch), to set a height of the beam assembly at a desired position aligned with the slots. In one example, one slot of the second track assembly 290 may be positioned at a deployed height of the beam assembly 230, such that the one or more latching fingers (not shown in the illustrated example) engage the slot. In one embodiment, the second track assembly 290 has a slot that is positioned at a same vertical height as a slot of the first track assembly 270, such that the second end assembly 242 can be coupled to the slot of the second track assembly 290 in a vertical position that allows the beam assembly 230 to lay horizontally across the cargo compartment 10, generally parallel to the floor of the cargo compartment 10, in a deployed state.

Figures 9A, 9B, 9C:
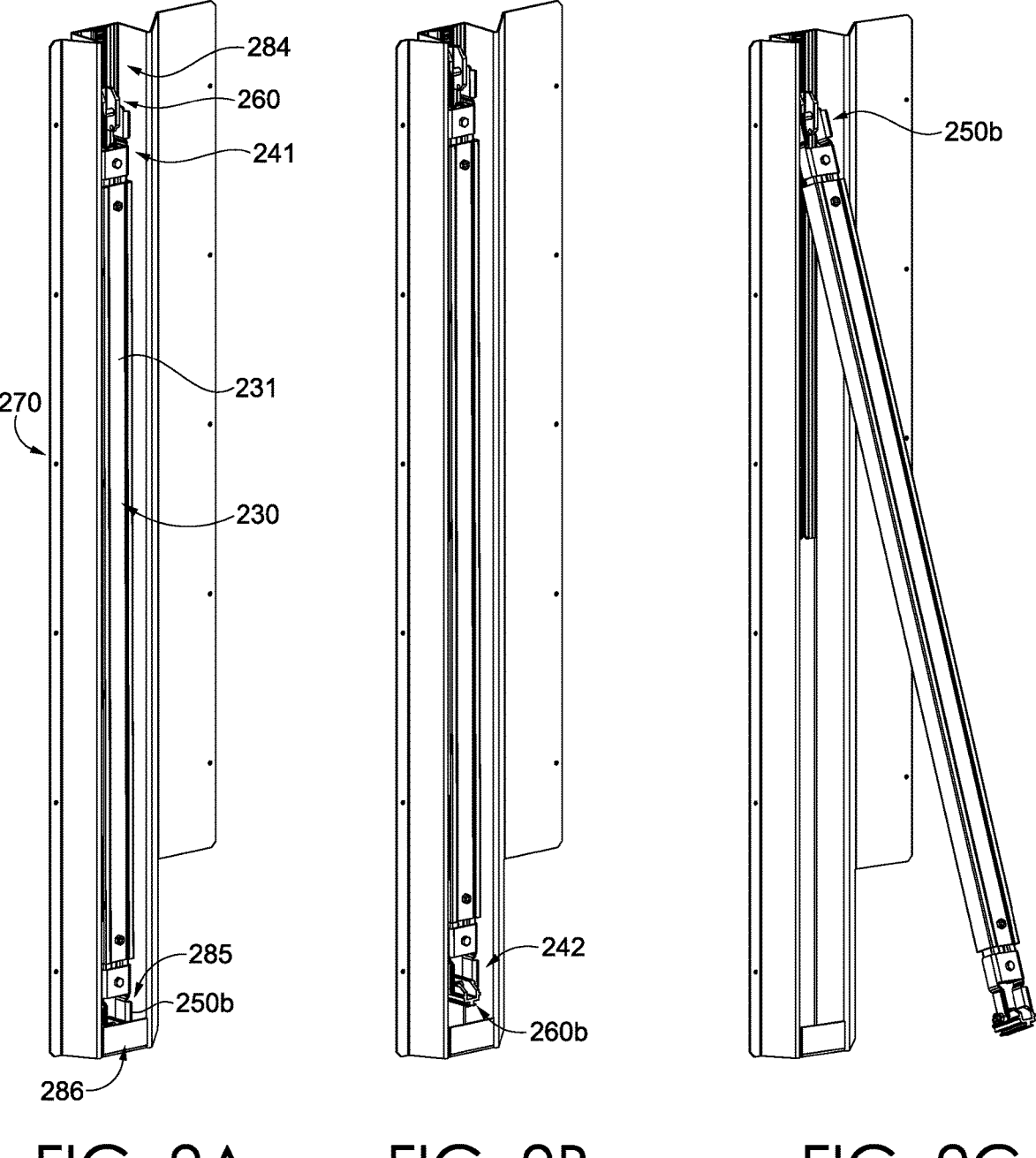
FIGS. 9A-9G depict a beam assembly and the first and second track assembly in different states and relative positions in association with a method for either deploying or stowing the beam assembly.

Referring now to FIGS. 9A-9G, exemplary method steps for using the restraint module 200 are shown and described. In FIGS. 9A, the restraint module 200 is shown in a storage state where the beam assembly 230 is positioned vertically within the first track assembly 270 (e.g., on the sidewall 14 of the cargo compartment 10). In this storage state, the beam assembly 230 sits within the storage compartment 284, with the carriage 260 of the first end assembly 241 being engaged in the track 272, and the carriage 260*b* (FIG. 9B) of the second end assembly 242 being close to the floor of the cargo compartment 10 (e.g., abutting the floor). The first and second end assemblies 241 and 242 may overlap a significant distance within the beam member 231 to achieve a relatively compact overall length of the beam assembly 10.

Further, in the storage state of FIG. 9A, the pocket 285 may receive at least a portion of the bracket assembly 250*b* and/or the carriage 260*b* (of the second end assembly 242), as depicted in FIG. 9A and described further in FIG. 6 above. Advantageously, in this manner, the pocket 285 limits movement of the second end assembly 242 into the cargo compartment 10, and protects the stored beam assembly 230 from forklift or cargo damage.

Referring to FIGS. 9B and 9C, when it becomes desirable to deploy the beam assembly 230, a user may vertically slide the carriage 260 upwards to allow the second end assembly 242 to clear the plate 286 and swing outwards (e.g., into the cargo compartment).

Figure 9D:
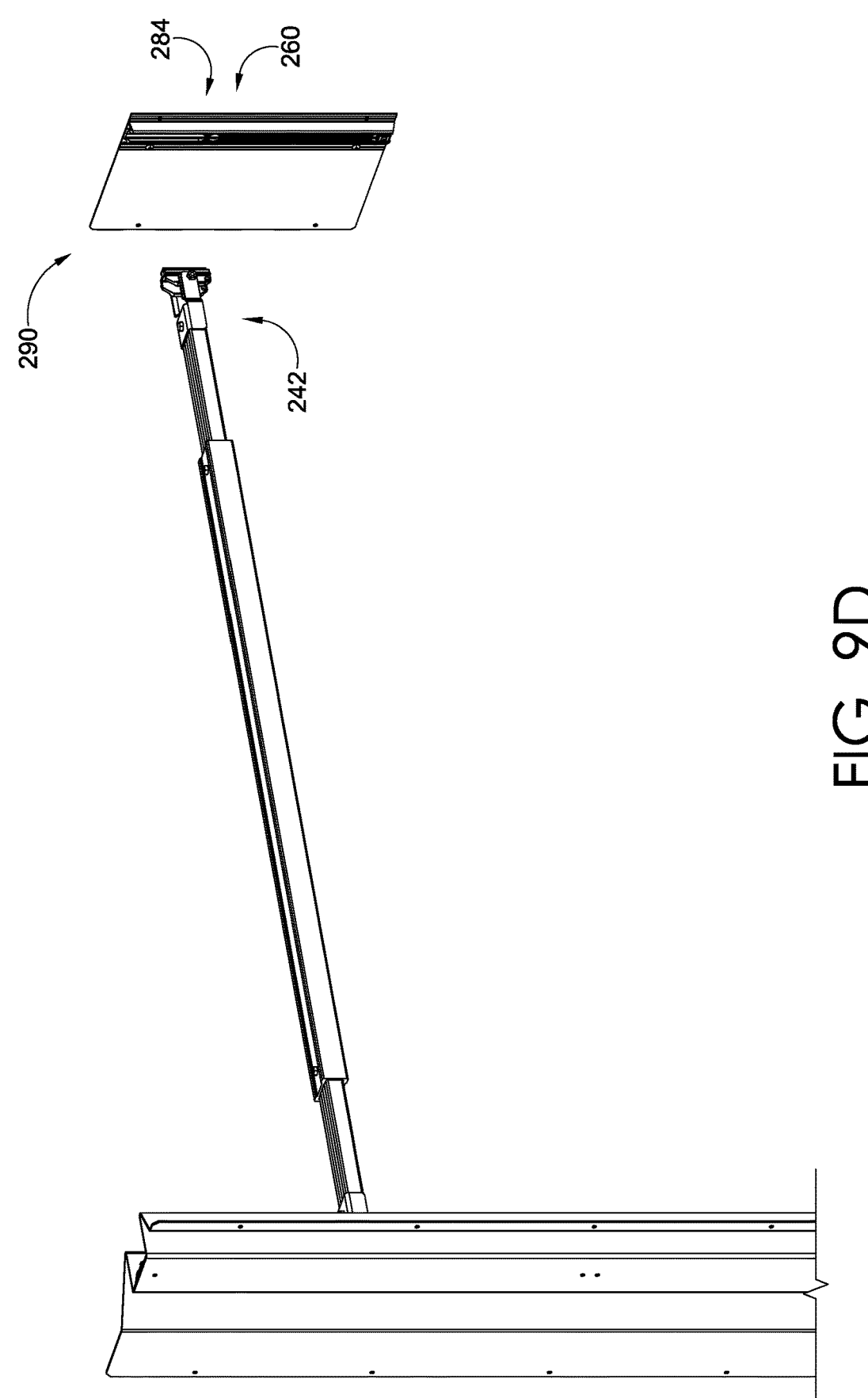

Referring to FIGS. 9C and 9D, once the second end assembly 242 has cleared the plate 286, the second end assembly 242 can be telescopically moved towards the second track assembly 290. Then, as shown in FIG. 9E, the carriage 260*b* can be inserted into the beam insertion space 299 (labeled in FIG. 9F) of the track 292. As described in FIGS. 8A and 8B above, the beam insertion space 299 omits the rails 295 and 296, and allows insertion of the second end assembly 242 of the beam assembly 230.

During this process, the bracket 250*a* (FIG. 9C) of the first end assembly 241 may rotate with respect to the track 272 of the first track assembly 270. In particular, the carriage 260 remains secured within the rails of the track 272, while a remainder of the beam assembly 230 is able to rotate around the bolt 257, which extends through the carriage 260 as explained above.

Further, in this process, an overall length of the beam assembly 230 may expand because the first end assembly 241 and/or the second end assembly 242 are allowed to extend (e.g., telescopically) further outside of the confines of the beam member 231, in order to accommodate the length needed to span across a width of the cargo compartment 10.

Figure 7E:
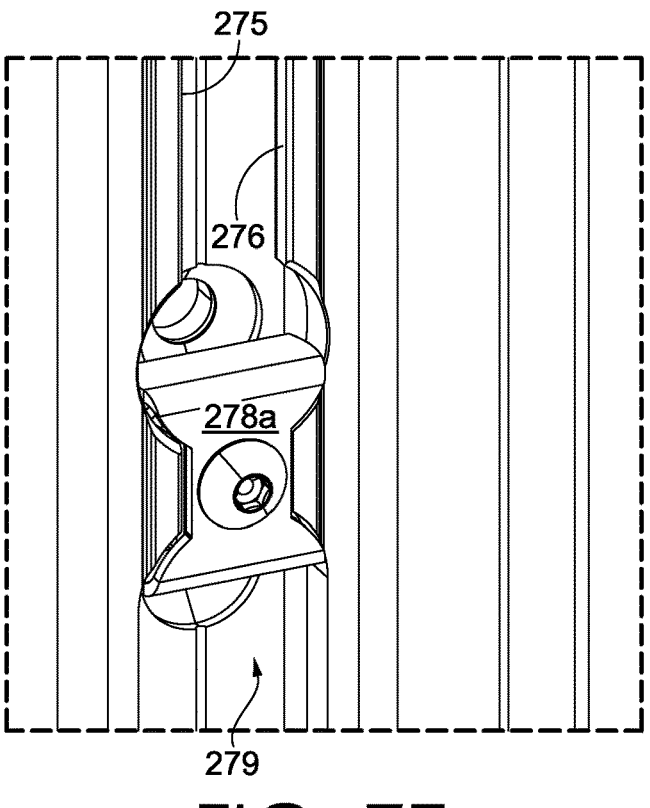
Figure 9F:
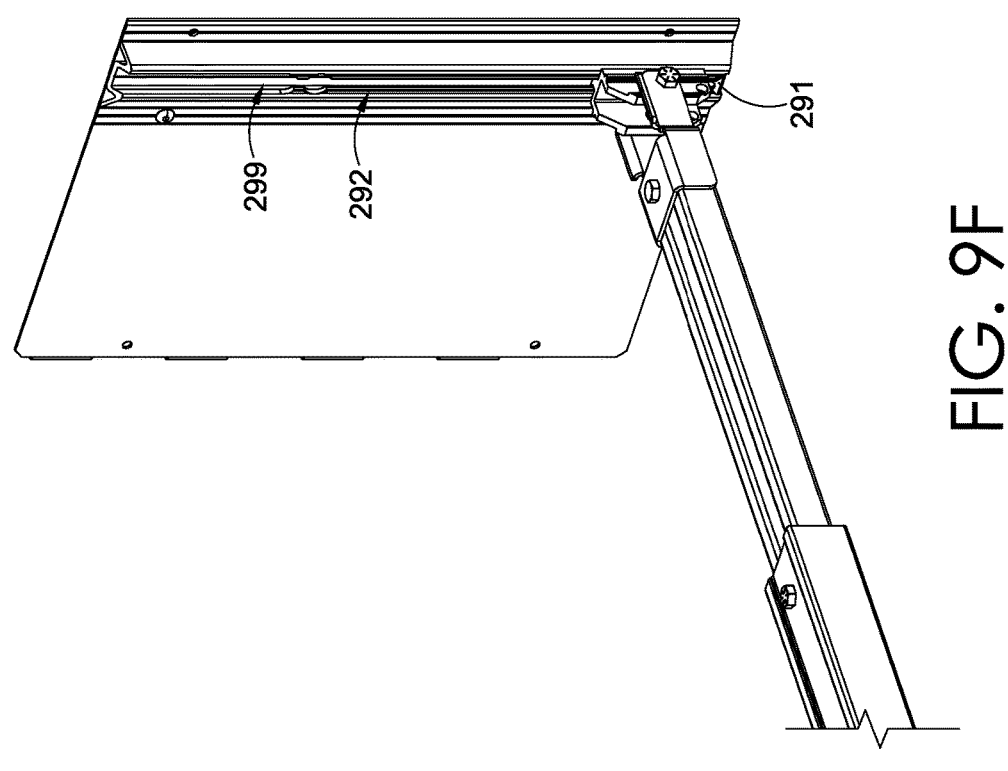
Figure 9E:
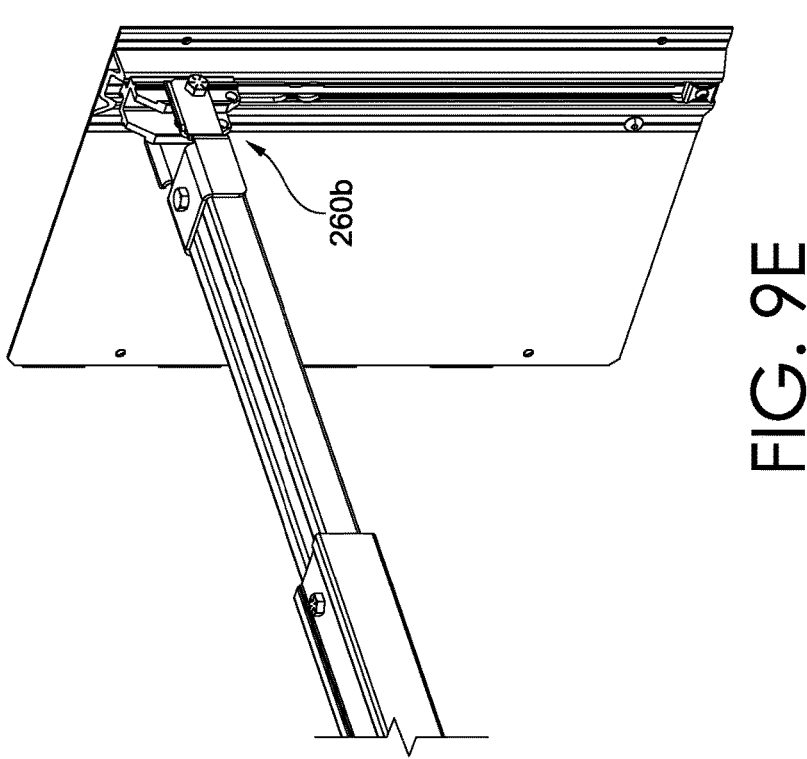
Figure 9G:
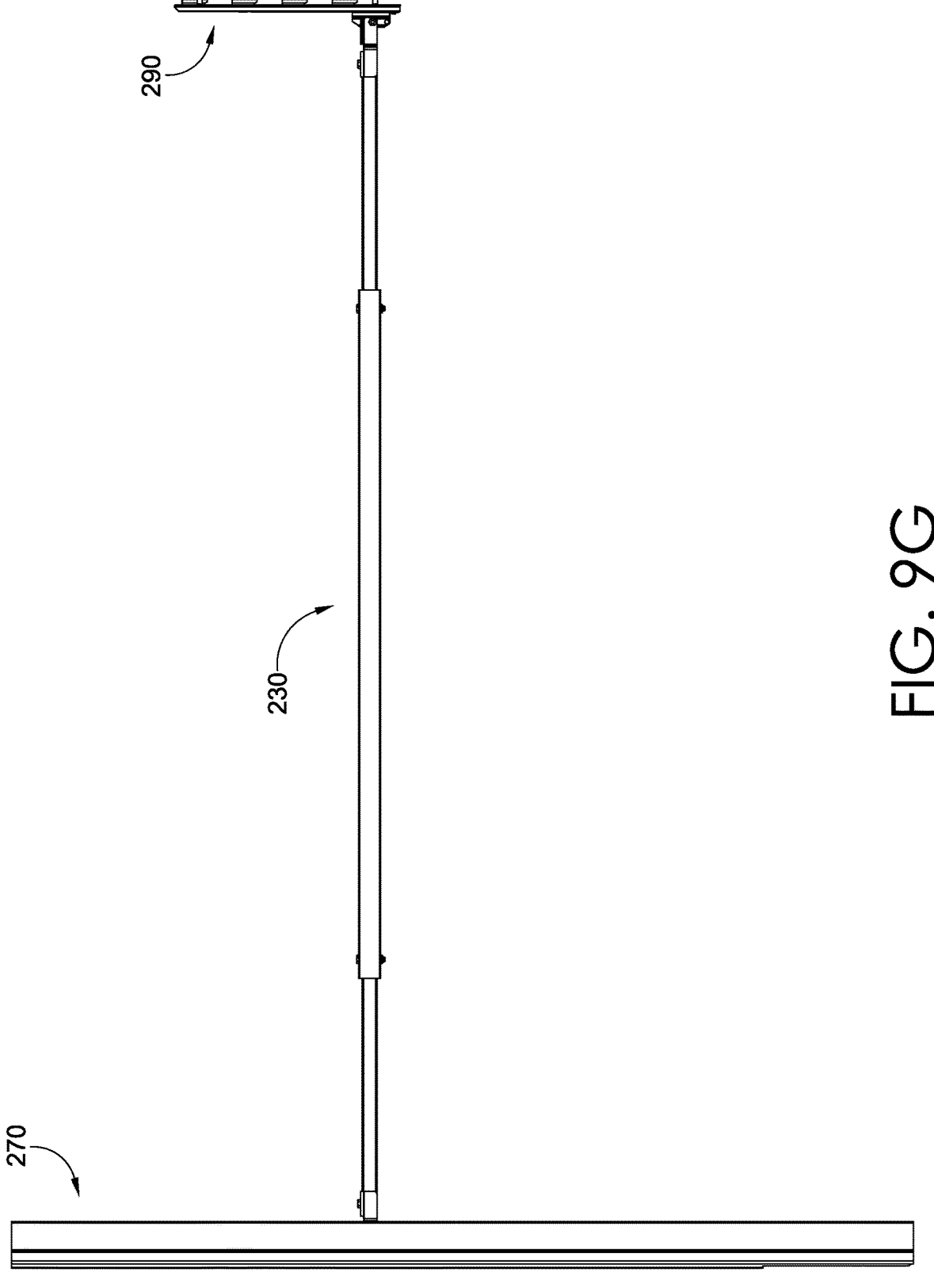

Referring to FIGS. 9F and 9G, the carriage 260b of the second end assembly 242 can be slid downward from the beam insertion space 299, and into engagement with the track 292. The guiding segments 262a and 262b of the carriage 260b become held "captive" within the respective rails of the 295 and 296 (e.g., FIG. 8B) of the track 292. The second end assembly 242 is moved further downward until the carriage 260b is supported on the stop 291 of the track 292. In addition, as shown in FIG. 9G, the carriage 260 associated with the first end assembly 241 can also slide down the track 272 until it is support on the lower stop 278a (FIG. 7E).

In the example of FIG. 9G, the deployed position of the beam assembly 230 is substantially horizontal with respect to a floor of the cargo compartment 10. A horizontal position may be achieved by having the lower stops 278a and 291 of each of the first and second track assemblies 270 and 290 (to which the first and second carriages 260 and 260b engage) be at the same horizontal height relative to the floor of the compartment 10. It will be appreciated that, in other embodiments, the beam assembly 230 may be deployed in an angled (or non-horizontal) position relative to the floor of the compartment, e.g., by providing a selection of engagement slots in the tracks 272 and 292 at different vertical heights, or providing other stop members on the tracks 272 and 292 that can retain the vertical positions of the end assemblies 241 and 242.

In order to return the beam assembly 230 from the deployed state of FIG. 9G to the storage state of FIG. 9A, a reverse sequence of steps occurs. For example, from the deployed state of FIG. 9G, a user can move the second end assembly 242 vertically higher, and disengage the carriage 260b from the track 292 by pulling the carriage 260b away from the track at the beam insertion space 299. Then, a user would then move the second end assembly 242 across the cargo compartment 10 and place the bracket 250b and/or the carriage 260b into the pocket 285 of the first track assembly 270, with the beam assembly 230 being positioned vertically within the storage compartment 284 in the state of FIG. 9A.

Advantageously, as noted above, the restraint module 200 allows the rear beam assembly 230 to have a stored (or non-use) position that does not extend across the lateral width of the cargo compartment 10, and therefore, will not impede the height within the storage compartment 10 near the trailer doors, which advantageously preserves the ability to advance high-cube freight through the trailer doors 19 and into the cargo compartment 10.

Notably, the available door width (for insertion of cargo into the compartment 10) is only reduced by about two inches when providing the first track assembly 270. In other words, the inwardly-located segments 281c and 282c of the forward and rearward guards 281 and 282 only protrude beyond the original door boundary by about two inches. In most instances, this protrusion has no adverse impact when loading standard pallets or cargo, e.g., having a width of 48 inches. In short, the advantages gained by removing any height restrictions near the door of the cargo compartment 10 generally outweigh the slight obstruction in width near the door, when the storage state of the beam assembly in the present system occurs along the first sidewall, as compared to horizontal storage across the ceiling.

As yet another advantage of the present system, the beam assembly 230 can remain captive at all times within the cargo compartment 10, i.e., in both the storage and deployed states. Therefore, there is no need to bring in stand-alone beams for each usage, thereby minimizing risks associated with loading beams to and from the storage compartment, or requirements of beams being stored at offsite locations.

As a further advantage, the restraint module 200 generally avoids the need to use cargo securement straps to secure cargo. In the example where the cargo 18 comprises a plurality of carts, a significant number of straps would be required to adequately restrain the carts individually, and the straps would take a relatively long time to install (and subsequently roll up to a storage state), as compared to the integral beam assembly 230 of the present embodiments.

As yet a further advantage, virtually any cargo compartment 10 (and particularly trucks) may be retrofitted with the restraint module 200. A retrofit simply requires installing the first track assembly 270 on the sidewall 14 of an existing storage compartment 10 and then installing the second track assembly 290 on the opposing sidewall 12, in a manner where there tracks 272 and 292 line up with one another.

It should be noted that while the restraint module 200 has been depicted in this example as containing the rear-most beam assembly 230, in other embodiments, restraint modules 200 may be deployed in a more forward position of the cargo compartment 10. For example, the five pairs of track sub-assemblies 80, 90, 100 and 110 described above may be omitted, and six restraint modules 200 may be spaced apart along the axial length of the cargo compartment 10 to form the six restraint zones 131-136 described in FIG. 3 above. Alternatively, a mixture of restraint modules 200 and track sub-assemblies 80, 90, 100 and 110 may be used anywhere in the same cargo compartment.

Further, it should be noted that when using the restraint modules 200, the first track assembly 270 comprising the housing 280 (which holds the beam assembly 230 in the storage state) may be positioned on a "street side" sidewall of the compartment, with the second track assembly 290 being on a "curb side" sidewall of the compartment (e.g., when the compartment is a truck), or the arrangement may be vice versa.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A beam-storage system for a cargo compartment, the system comprising:
   a first track assembly configured to attach to a first sidewall of the cargo compartment;
   a second track assembly configured to attach to a second sidewall of the cargo compartment and opposite the first track assembly; and
   a beam assembly comprising:
   a first end assembly configured to be secured to the first track assembly; and a second end assembly configured to be removably secured to and slidably engaged with the second track assembly;
   wherein the beam assembly comprises a storage state in which the second end assembly is detached from the second track assembly and both the first and second end assemblies are disposed adjacent to the first sidewall, and wherein the beam assembly comprises a deployed state in which the first end assembly is attached to and slidably engaged with the first track assembly and the second end assembly is attached to and slidably engaged with the second track assembly.

2. The system of claim 1, wherein the first track assembly comprises a housing, wherein the track of the first track assembly is positioned within the housing, and wherein the beam assembly is positioned within the housing in the storage state.

3. The system of claim 2, wherein the housing comprises a forward guard and a rearward guard, and wherein a track of the first track assembly is disposed in an axial space between the forward guard and the rearward guard.

4. The system of claim 2, wherein a storage compartment is formed in the housing, the storage compartment being bounded at least partially by walls of the forward guard and the rearward guard and a rear wall associated with the housing.

5. The system of claim 4, wherein in a cross section the beam assembly comprises a longer length and a shorter width, and wherein in the storage state the longer length extends between the forward guard and the rearward guard.

6. The system of claim 4, wherein a pocket is formed at a bottom of the storage compartment, the pocket comprising a plate extending between the forward guard and the rearward guard, and wherein the pocket is dimensioned to receive a portion of the second end assembly when the beam assembly is in the storage state.

7. The system of claim 3, wherein at least one of the forward guard and the rearward guard comprises a wall that is angled relative to the first sidewall of the cargo compartment.

8. The system of claim 1, wherein the track of the first track assembly comprises:

first and second rails, each extending between upper and lower ends of the first track assembly, and configured to slidingly mate with a carriage of the first end assembly, and wherein a bracket assembly rotates relative to the carriage when the beam assembly moves between the storage state and the deployed state.

9. The system of claim 1, wherein the beam assembly comprises a carriage having one or more rails for slidably engaging the first track assembly, and wherein the beam assembly comprises a rectangular cross section having a length that is perpendicular to a longitudinal orientation of the one or more rails.

10. The system of claim 1, wherein the first track assembly and the second track assembly comprises a first stop and a second stop, respectively; wherein the first stop and the second stop are positioned at a substantially same height; and wherein the beam assembly is supported on the first stop and the second stop when in a deployed state.

11. The system of claim 1, wherein a track of the second track assembly comprises one or more rails configured to slidably mate with a carriage of the second end assembly, and wherein the track comprises a beam insertion space that omits the one or more rails and is dimensioned to receive the carriage of the second end assembly when the beam assembly is moved between the storage state and the deployed state.

12. The system of claim 1, wherein the first track assembly and the second track assembly are configured to attach to a rear door from of the cargo compartment.

13. A beam-storage system for a cargo compartment, the system comprising:

a first track assembly comprising a housing and a first track positioned within the housing;

the housing comprising a forward guard, a rearward guard, and a back wall, with the first track being disposed on the back wall and in an axial space between the forward guard and the rearward guard; and a beam assembly comprising a first end assembly having a carriage configured to be slidably secured to the first track, wherein the beam assembly is rotatable relative to the carriage to move between a stored state, in which the beam assembly is positioned in the axial space, and a deployed state, in which the beam assembly is substantially perpendicular relative to the first track; and a second end assembly configured to be removably coupled to and slidably engaged with a second track when the beam assembly is in the deployed state.

14. The system of claim 13, wherein the beam assembly comprises a shorter width and a longer length, the shorter width being measured between a first face and a second face; and wherein in the stored state the first face is oriented towards the back wall.

15. The system of claim 13, wherein a pocket is positioned at a bottom of the storage compartment by a plate extending between the forward guard and the rearward guard, and wherein the pocket houses a portion of a second end assembly of the beam assembly when the beam assembly is in the storage state.

16. The system of claim 13, wherein the forward guard and the rearward guard taper towards one another.

17. The system of claim 13, wherein, in the stored state, both the first and second end assemblies are disposed between the forward guard and the rearward guard.

18. A method comprising:

providing a first track assembly positioned on a first sidewall of a cargo compartment;

providing a second track assembly positioned on a second sidewall of the cargo compartment;

providing a beam assembly comprising a first end assembly configured to be secured to the first track assembly and a second end assembly configured to be removably secured and slidably engaged to the second track assembly;

positioning the beam assembly in a storage state in which both the first and second end assemblies are disposed adjacent to the first sidewall; and moving the beam assembly to a deployed state in which the beam assembly extends across the cargo compartment from the first sidewall to the second sidewall.

19. The method of claim 18, wherein the first track assembly comprises a housing, and wherein the beam assembly is positioned in the vertical orientation within the housing in the storage state.

20. The method of claim 19, wherein the housing comprises a forward guard and a rearward guard, and wherein both the first and second end assemblies are positioned between the forward guard and the rearward guard in the storage state.

* * * * *